United States Patent
Calderara et al.

(10) Patent No.: US 11,098,415 B2
(45) Date of Patent: *Aug. 24, 2021

(54) ELECTRODE FOR OXYGEN EVOLUTION IN INDUSTRIAL ELECTROCHEMICAL PROCESSES

(71) Applicant: INDUSTRIE DE NORA S.P.A., Milan (IT)

(72) Inventors: Alice Calderara, Milan (IT); Luciano Iacopetti, Milan (IT); Fabio Timpano, Desio (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/439,908

(22) PCT Filed: Nov. 29, 2013

(86) PCT No.: PCT/EP2013/075055
§ 371 (c)(1),
(2) Date: Apr. 30, 2015

(87) PCT Pub. No.: WO2014/083144
PCT Pub. Date: Jun. 5, 2014

(65) Prior Publication Data
US 2015/0292106 A1    Oct. 15, 2015

(30) Foreign Application Priority Data

Nov. 29, 2012 (IT) .......................... MI2012A002035

(51) Int. Cl.
| | | |
|---|---|---|
| C25D 17/10 | (2006.01) | |
| C25C 7/02 | (2006.01) | |
| C25B 11/093 | (2021.01) | |
| C25D 3/06 | (2006.01) | |
| C25C 1/10 | (2006.01) | |
| C25D 3/04 | (2006.01) | |

(52) U.S. Cl.
CPC ............ *C25D 17/10* (2013.01); *C25B 11/093* (2021.01); *C25C 1/10* (2013.01); *C25C 7/02* (2013.01); *C25D 3/04* (2013.01); *C25D 3/06* (2013.01)

(58) Field of Classification Search
CPC ........... C25D 17/10–17/14; C25C 7/02–7/025; C25B 11/0484; C25B 11/0478; C25B 11/0442; C25B 11/0415; C25B 11/041; C25B 11/0405; C25B 11/04; C25B 11/00–11/097; B01J 23/14; B01J 23/18; B01J 23/46; B01J 23/468

See application file for complete search history.

(56) References Cited

U.S. PATENT DOCUMENTS

| | | | | |
|---|---|---|---|---|
| 3,915,838 | A | * 10/1975 | Lee ..................... | C25B 11/0484 204/290.08 |
| 3,950,240 | A | * 4/1976 | Cookfair ............. | C25B 11/0484 204/290.08 |
| 4,213,843 | A | 7/1980 | Sato et al. | |
| 4,498,942 | A | 2/1985 | Asano et al. | |
| 6,210,550 | B1 | * 4/2001 | Nidola ................ | C25B 11/0484 204/290.14 |
| 2007/0000774 | A1 | 1/2007 | Weres | |
| 2012/0125785 | A1 | * 5/2012 | Gulla .................. | C25B 11/0478 205/633 |

FOREIGN PATENT DOCUMENTS

| | | | | |
|---|---|---|---|---|
| IT | WO 2012101141 A1 | * 8/2012 | ............... | C25B 1/02 |
| JP | 02190491 A | * 7/1990 | ............. | C25B 11/10 |
| WO | 03100135 A2 | 12/2003 | | |
| WO | 2005014885 | 2/2005 | | |

OTHER PUBLICATIONS

Morimitsu et al (Journal of Applied Electrochemistry, 30, 511-514, 2000).*
Chen et al (Journal of Physical Chemistry B, 2001, 105, 4623-4628).*
Balko et al (Journal Of Applied Electrochemistry, 21, 1991, 678-682).*
Ardizzone et al (Journal of Electroanalytical Chemistry, 589, 2006, 160-166).*
Sardar et al ("Bismuth Iridium Oxide Oxygen Evolution Catalyst from Hydrothermal Synthesis", Chemistry of Materials, Oct. 2012, 24 (21), pp. 4192-4200). (Year: 2012).*
International Search Report issued in PCT Application No. PCT/EP2013/075055.

* cited by examiner

*Primary Examiner* — Alexander W Keeling
(74) *Attorney, Agent, or Firm* — Lucas & Mercanti, LLP

(57) ABSTRACT

The invention relates to an electrode for electrolytic processes, in particular to an anode suitable for oxygen evolution comprising a valve metal substrate, a catalytic layer, a protection layer consisting of oxides of valve metals interposed between the substrate and the catalytic layer and an outer coating of oxides of valve metals. The electrode of the invention is particularly suitable for processes of cathodic electrodeposition of chromium from an aqueous solution containing Cr (III).

4 Claims, No Drawings

ELECTRODE FOR OXYGEN EVOLUTION IN INDUSTRIAL ELECTROCHEMICAL PROCESSES

This application is a U.S. national stage of PCT/EP2013/075055 filed on Nov. 29, 2013 which claims the benefit of priority from Italian Patent Application No. MI2012A002035 filed Nov. 29, 2012, the contents of each of which are incorporated herein by reference.

FIELD OF THE INVENTION

The invention relates to an electrode for electrolytic processes, in particular to an anode suitable for oxygen evolution in an industrial electrolytic process and to a method of manufacturing thereof.

BACKGROUND OF THE INVENTION

The invention relates to an electrode for electrolytic processes, in particular to an anode suitable for oxygen evolution in an industrial electrolysis process. Anodes for oxygen evolution are widely used in various electrolytic applications, several of which fall within the field of cathodic metal electrodeposition (electrometallurgy) and cover a wide range in terms of applied current density, which can be very small (for instance a few hundred $A/m^2$, such as in metal electrowinning processes) or very high (such as the case of some galvanic electrodeposition applications, which can operate above 10 $kA/m^2$, referred to the anodic surface); another field of application of anodes for oxygen evolution is cathodic protection with impressed current. In the field of electrometallurgy, with particular reference to metal electrowinning, the use of lead-based anodes is traditionally widespread and still valuable for some applications although presenting a rather high oxygen evolution overpotential besides entailing the well known environmental and human health concerns associated with the use of this material. More recently—especially for high current density applications, which benefit the most from energy savings associated with a more reduced oxygen evolution potential electrodes for anodic evolution of oxygen obtained from valve metals substrates, for example titanium and alloys thereof, coated with catalytic compositions based on noble metals or oxides thereof have been introduced on the market.

It should also be considered that the operating lifetime of anodes based on metal or metal oxide-coated valve metal substrates is greatly reduced in the presence of particularly aggressive contaminants, capable of establishing accelerated phenomena of corrosion or pollution of the anode surface. There are also known, in fact, anodes comprising a substrate coated with a catalytic composition and provided with an outer coating of valve metal oxides for the sake of improving durability. In the latter case, however, the presence of the outer valve metal oxide layer, if too thick, increases the potential to unacceptable values.

It has thus been evidenced the need for providing anodes for oxygen evolution characterised by adequate oxygen overpotential and duration overcoming the drawbacks of prior art electrodes in process conditions involving the presence of additives, such as in decorative chrome plating with trivalent chromium.

SUMMARY OF THE INVENTION

Various aspects of the invention are set out in the accompanying claims.

Under one aspect, the invention relates to an electrode suitable for oxygen evolution in electrolytic processes comprising a valve metal substrate, a catalytic layer, a protective layer consisting of valve metals oxides interposed between the substrate and the catalytic layer and an external layer of valve metal oxides, said catalytic layer comprising oxides of iridium, of in and of at least one doping element M selected between bismuth and tantalum, the molar ratio of Ir:(Ir+Sn) ranging from 0.25 to 0.55 and the molar ratio M:(Ir+Sn+M) ranging from 0.02 to 0.15.

In one embodiment, the molar ratio M:Ir+Sn+M) of the catalytic layer of the electrode according to the invention ranges from 0.05 to 0.12.

In a further embodiment, the molar concentration of iridium in the catalytic layer ranges between 40 and 50% with respect to the sum of iridium and tin; the inventors have found that in this composition range the element doping is particularly effective in allowing the formation of crystallites of reduced dimensions and high catalytic activity, for example having a size below 5 nm. The inventors have also observed that when the catalytic layer has a composition and a crystallite size as described, the deposition of an additional external layer of valve metal having a barrier function leads to a more regular and homogeneous overall morphology, so that the increase of potential due to the addition of such external layers atop the catalytic layer is much reduced.

In one embodiment, the protective layer interposed between the catalytic layer and the valve metal substrate comprises a valve metal oxide capable of forming a thin film impervious to electrolytes, for example selected between titanium oxide, tantalum oxide or mixtures of the two. This has the advantage of further protecting the underlying substrate made of titanium or other valve metal from the attack of aggressive electrolytes, for example in processes such as those typical of metal plating.

In one embodiment, the electrode is obtained on a substrate of titanium, optionally alloyed; compared to the other valve metals, titanium is characterised by a reduced cost coupled to a good corrosion resistance. Furthermore, titanium has a good machinability, allowing its use for obtaining substrates of various geometry, for example in form of planar sheet, punched sheet, expanded metal sheet or mesh, according to the needs of different applications.

In a further embodiment, the electrode has a specific loading of valve metal oxides in the external layer ranging from 2 to 25 $g/m^2$. The inventors have surprisingly found that such barrier layer applied by thermal decomposition atop a catalytic layer as hereinbefore described produces a beneficial increase in the duration of electrodes used for anodic oxygen evolution, particularly in the range from 2 to 7 $g/m^2$, and a lesser increase in potential compared to that observable upon adding the same to catalytic layers of the prior art.

In a further embodiment, the electrode of the invention has a specific loading of valve metal oxides in the external layer ranging from 9 to 25 $g/m^2$. The inventors have surprisingly observed that even with these increased amounts of valve metal oxides in the outer layer, the anodic potential is still better than the one typical of the addition to catalytic layers of the prior art and additionally that the layer serves as an effective barrier against the diffusion of compounds and ions present in the electrolyte to the catalytic layer. These combines features, namely a lower anodic potential and a substantial decrease of diffusion, are for instance very important for decorative chrome plating, since a potential reduction even of a mere 50 mV at 1000 $A/m^2$ coupled to a lesser diffusion of Cr (III) ions decreases the kinetics of the parasitic anodic reaction of Cr (III) oxidation to Cr (VI), which can seriously impair the quality of the cathodic deposit of chromium metal. In the prior art, Cr (VI) production due to parasitic reaction is usually compensated by supplying additives requiring a periodic purging of the bath and their subsequent restoring with fresh solution.

In one embodiment, the electrode of the invention is provided with an external layer of valve metal oxides made of one component selected between titanium oxide and tantalum oxide.

Under another aspect, the invention relates to a method for manufacturing an electrode suitable for use as oxygen-evolving anode in electrolytic processes comprising the application in one or more coats of a solution containing precursors of iridium, tin and said at least one doping element M to a valve metal substrate and the subsequent decomposition of said solution by heat treatment in air at a temperature of 480 to 530° C., with formation of said catalytic coating and with formation of said external layer by application and subsequent thermal decomposition of a solution containing a precursor of titanium or tantalum.

Prior to said step of catalytic coating application, the substrate may be provided with a protective layer of valve metal oxides applied by procedures such as flame or plasma spraying, prolonged heat treatment in an air atmosphere, thermal decomposition of a solution containing compounds of valve metals such as titanium or tantalum, or other.

Under another aspect, the invention relates to a process of cathodic electrodeposition of metals from an aqueous solution wherein the anodic half-reaction is an oxygen evolution reaction carried out on the surface of an electrode as hereinbefore described.

Under a further aspect, the invention relates to a process of cathodic electrodeposition of chromium from an aqueous solution containing Cr (III).

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXAMPLE 1

A titanium sheet grade 1 of 200 mm×200 mm×3 mm size was degreased with acetone in a ultrasonic bath for 10 minutes and subjected first to sandblasting with corundum grit until obtaining a value of superficial roughness Rz of 40 to 45 μm, then to annealing for 2 hours at 570° C., then to an etching in 27% by weight $H_2SO_4$ at a temperature of 85° C. for 105 minutes, checking that the resulting weight loss was comprised between 180 and 250 g/m².

After drying, a protective layer based on titanium and tantalum oxides at a 80:20 molar ratio was applied to the sheet, with an overall loading of 0.6 g/m² referred to the metals (equivalent to 0.87 g/m² referred to the oxides). The application of the protective layer was carried out by painting in three coats of a precursor solution obtained by addition of an aqueous $TaCl_5$ solution, acidified with HCl, to an aqueous solution of $TiCl_4$ and subsequent thermal decomposition at 515° C.

A 1.65 M solution of Sn hydroxyacetochloride complex (hereinafter: SnHAC) was prepared according to the procedure disclosed in WO 2005/014885.

A 0.9 M solution of Ir hydroxyacetochloride complex (hereinafter: IrHAC) was prepared by dissolving $IrCl_3$ in 10% vol. aqueous acetic acid, evaporating the solvent, adding 10% aqueous acetic acid with subsequent solvent evaporation twice more, finally dissolving the product in 10% aqueous acetic acid again to obtain the specified concentration.

A precursor solution containing 50 g/l of bismuth was prepared by cold dissolution of 7.54 g of $BiCl_3$ under stirring in a beaker containing 60 ml of 10% wt. HCl. Upon completion of the dissolution, once a clear solution was obtained, the volume was brought to 100 ml with 10% wt. HCl.

10.15 ml of the 1.65 M SnHAC solution, 10 ml of the 0.9 M IrHAC solution and 7.44 ml of the 50 g/l Bi solution were added to a second beaker kept under stirring. The stirring was protracted for 5 more minutes. 10 ml of 10% wt. acetic acid were then added.

Part of the solution was applied by brushing in 7 coats to the previously treated titanium sheet, carrying out a drying step at 60° C. for 15 minutes after each coat and a subsequent decomposition at high temperature for 15 minutes. The high temperature decomposition step was carried out at 480° C. after the first coat, at 500° C. after the second coat, at 520° C. after the subsequent coats.

In this way, a catalytic layer having an Ir:Sn:Bi molar ratio of 33:61:6 and a specific Ir loading of about 10 g/m² was applied.

The application of the external layer was then carried out (for an amount of 12 g/m² referred to the oxides) by brushing in 8 coats of an aqueous $TaCl_5$ solution, acidified with HCl. Three samples of 1 cm² area were cut out from the electrode thus obtained and subjected to an accelerated duration test under anodic oxygen evolution, by measuring the deactivation time (defined as the time of operation required for observing a 1 V potential increase) in $H_2SO_4$ at 150 g/l, at a temperature of 60° C. and at a current density of 30 kA/m². The average deactivation time of the three samples was found to be 600 hours.

An anodic potential of 1.556 V/NHE was measured at 1000 A/m².

EXAMPLE 2

A titanium sheet grade 1 of 200 mm×200 mm×3 mm size was pre-treated and provided with a protective layer based on titanium and tantalum oxides at a 80:20 molar ratio as in the previous example. A precursor solution containing 50 g/l of tantalum was prepared by placing 10 g of $TaCl_5$ in a beaker containing 60 ml of 37% by weight HCl bringing the whole mixture to boiling for 15 minutes under stirring. 50 ml of demineralised $H_2O$ were then added and the solution was kept under heating for about 2 hours until the volume was back to 50±3 ml. 60 ml of 37% by weight HCl were then added obtaining a clear solution, again brought to boiling until the volume was back to 50±3 ml. The volume was then brought to 100 ml with demineralised $H_2O$. To a second beaker kept under stirring, 10.15 ml of the 1.65 M SnHAC solution of the previous example, 10 ml of the 0.9 M IrHAC solution of the previous example and 7.44 ml of the 50 g/l Ta solution were added. The stirring was protracted for 5 minutes. 10 ml of 10% by weight acetic acid were then added. Part of the solution was applied by brushing in 8 coats to the previously treated titanium sheet, carrying out a drying step at 60° C. for 15 minutes after each coat and a subsequent decomposition at high temperature for 15 minutes. The high temperature decomposition step was carried out at 480° C. after the first coat, at 500° C. after the second coat, at 520° C. after the subsequent coats.

In this way, a catalytic layer having an Ir:Sn:Ta molar ratio of 32.5:60:7.5 and a specific Ir loading of about 10 g/m$^2$ was applied.

The application of the external layer was then carried out (for an amount of 15 g/m$^2$ referred to the oxides) by brushing in 10 coats of an aqueous TaCl$_5$ solution, acidified with HCl. Three samples of 1 cm$^2$ area were cut out from the electrode thus obtained and subjected to an accelerated duration test under anodic oxygen evolution, by measuring the deactivation time (defined as the time of operation required for observing a 1 V potential increase) in H$_2$SO$_4$ at 150 g/l, at a temperature of 60° C. and at a current density of 30 kA/m$^2$. The average deactivation time of the three samples was found to be 520 hours.

An anodic potential of 1.579 V/NHE was measured at 1000 A/m$^2$.

COUNTEREXAMPLE 1

A titanium sheet grade 1 of 200 mm×200 mm×3 mm size was degreased and subjected first to sandblasting with corundum grit until obtaining a value of superficial roughness Rz of 70 to 100 µm, then to an etching in 20% by weight HCl at a temperature of 90-100° C. for 20 minutes.

After drying, a protective layer based on titanium and tantalum oxides at a 80:20 molar ratio was applied to the sheet, with an overall loading of 0.6 g/m$^2$ referred to the metals (equivalent to 0.87 g/m$^2$ referred to the oxides). The application of the protective layer was carried out by painting in three coats of a precursor solution—obtained by addition of an aqueous TaCl$_5$ solution, acidified with HCl, to an aqueous solution of TiCl$_4$—and subsequent thermal decomposition at 500° C.

On the protective layer, a catalytic coating based on oxides of iridium and tantalum at a 65:35 weight ratio (equivalent to a molar ratio of about 66.3:36.7) was then applied, with an overall iridium loading of 10 g/m$^2$. The electrode was heat-treated at 515° C. for 2 h, then the application of the external layer was carried out (for an amount of 15 g/m$^2$ referred to the oxides) by brushing in 10 coats of an aqueous TaCl$_5$ solution, acidified with HCl. Three samples of 1 cm$^2$ area were cut out from the electrode thus obtained and subjected to an accelerated duration test under anodic oxygen evolution, by measuring the deactivation time (defined as the time of operation required for observing a 1 V potential increase) in H$_2$SO$_4$ at 150 g/l, at a temperature of 60° C. and at a current density of 30 kA/m$^2$. The average deactivation time of the three samples was found to be 525 hours.

An anodic potential of 1.601 V/NHE was measured at 1000 A/m$^2$.

COUNTEREXAMPLE 2

A titanium sheet grade 1 of 200 mm×200 mm×3 mm size was degreased and subjected first to sandblasting with corundum grit until obtaining a value of superficial roughness Rz of 70 to 100 µm, then to an etching in 20% by weight HCl at a temperature of 90-100° C. for 20 minutes.

After drying, a protective layer based on titanium and tantalum oxides at a 80:20 molar ratio was applied to the sheet, with an overall loading of 0.6 g/m$^2$ referred to the metals (equivalent to 0.87 g/m$^2$ referred to the oxides). The application of the protective layer was carried out by painting in three coats of a precursor solution obtained by addition of an aqueous TaCl$_5$ solution, acidified with HCl, to an aqueous solution of TiCl$_4$ —and subsequent thermal decomposition at 500° C.

On the protective layer, a catalytic coating consisting of two distinct layers was then applied: a first layer (internal) based on oxides of iridium and tantalum at a 65:35 weight ratio (equivalent to a molar ratio of about 66.3:36.7), with an overall iridium loading of 2 g/m$^2$ and a second layer (external) based on oxides of iridium, tantalum and titanium at a 78:20:2 weight ratio (corresponding to a molar ratio of about 80.1:19.4:0.5), for an overall iridium loading of 10 g/m$^2$.

The application of the external layer was then carried out (for an amount of 15 g/m$^2$ referred to the oxides) by brushing in 10 coats of an aqueous TaCl$_5$ solution, acidified with HCl. Three samples of 1 cm$^2$ area were cut out from the electrode thus obtained and subjected to an accelerated duration test under anodic oxygen evolution, by measuring the deactivation time (defined as the time of operation required for observing a 1 V potential increase) in H$_2$SO$_4$ at 150 g/l, at a temperature of 60° C. and at a current density of 30 kA/m$^2$. The average deactivation time of the three samples was found to be 580 hours.

An anodic potential of 1.602 V/NHE was measured at 1000 A/m$^2$.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. Electrode suitable for oxygen evolution in electrolytic processes comprising
   a valve metal substrate,
   a catalytic layer,
   a protective layer consisting of valve metal oxides interposed between said substrate and said catalytic layer, and
   an external layer of a valve metal oxide, the valve metal oxide comprising tantalum pentoxide,
   said catalytic layer comprising mixed oxides of iridium, of tin and doping element M being bismuth, the molar ratio Ir:(Ir+Sn) ranging from 0.25 to 0.55 and the molar ratio M:(Ir+Sn+M) ranging from 0.02 to 0.15,
   wherein the specific loading of said valve metal oxides in said external layer ranges from 12 to 15 g/m$^2$ referred to the oxides.

2. The electrode according to claim 1 wherein said molar ratio M:(Ir+Sn+M) ranges from 0.05 to 0.12.

3. The electrode according to claim 1 wherein said molar ratio Ir:(Ir+Sn) ranges from 0.40 to 0.50.

4. The electrode according to claim 1 wherein said oxides of iridium, of tin and doping element M in said catalytic layer consist of crystallites of average size below 5 nm.

\* \* \* \* \*